United States Patent
Gotoh et al.

(10) Patent No.: US 9,683,168 B2
(45) Date of Patent: Jun. 20, 2017

(54) MANUFACTURING METHOD OF NITRIDE PHOSPHOR OR OXYNITRIDE PHOSPHOR

(75) Inventors: Masahiro Gotoh, Tokyo (JP); Kenji Sakane, Okayama (JP)

(73) Assignees: NICHIA CORPORATION, Anan-Shi (JP); CITIZEN ELECTRONICS CO., LTD., Fujiyoshida-Shi (JP)

( * ) Notice: Subject to any disclaimer, the term of this patent is extended or adjusted under 35 U.S.C. 154(b) by 1306 days.

(21) Appl. No.: 12/310,673

(22) PCT Filed: Sep. 7, 2007

(86) PCT No.: PCT/JP2007/067536
§ 371 (c)(1),
(2), (4) Date: Apr. 20, 2009

(87) PCT Pub. No.: WO2008/041452
PCT Pub. Date: Apr. 10, 2008

(65) Prior Publication Data
US 2010/0001234 A1   Jan. 7, 2010

(30) Foreign Application Priority Data

Sep. 29, 2006   (JP) .................................. 2006-269796

(51) Int. Cl.
*C09K 11/77* (2006.01)
*C04B 35/597* (2006.01)
(Continued)

(52) U.S. Cl.
CPC ........ *C09K 11/7734* (2013.01); *C04B 35/597* (2013.01); *C04B 35/6262* (2013.01);
(Continued)

(58) Field of Classification Search
CPC ............ C09K 11/7721; C09K 11/7734; C09K 11/7701
(Continued)

(56) References Cited

U.S. PATENT DOCUMENTS 3,368,861 A * 2/1968 Rubinstein et al. .......... 359/283
4,243,621 A * 1/1981 Mori et al. .................... 264/647
(Continued)

FOREIGN PATENT DOCUMENTS

JP   A-2001-214162   8/2001
JP   A-2003-124527   4/2003
(Continued)

OTHER PUBLICATIONS

Faraday, Michael. Chemical Manipulation: Being Instructions to Students in Chemistry on the Methods of Performing Experiments of Demonstration or Research, with Accuracy and Success. London 1842.*
(Continued)

*Primary Examiner* — Matthew E Hoban
(74) *Attorney, Agent, or Firm* — Foley & Lardner LLP

(57) ABSTRACT

To reduce impurity contents of carbon and oxygen not contributing to light emission, then suppress deterioration of emission intensity of a phosphor, and improve emission efficiency of this phosphor. Therefore, there is provided a firing method of nitride or oxynitride phosphors, wherein a crucible 11 made of nitride is used as a firing container, and firing is performed, with this crucible covered with a lid (container 10), to manufacture the phosphor. The phosphor is expressed by a general composition formula $MABO_oN_{3-2/3o}$:Z in which element M is one or more kinds of elements having bivalent valency, element A is one or more kinds of elements having tervalent valency, element B is one or more kinds of elements having tetravalent valency, O is oxygen, N is nitrogen, and element Z is an activating agent, satisfying $o \geq 0$.

10 Claims, 2 Drawing Sheets

(51) Int. Cl.
*C04B 35/626* (2006.01)
*C09K 11/08* (2006.01)

(52) U.S. Cl.
CPC .. *C09K 11/0883* (2013.01); *C04B 2235/3224* (2013.01); *C04B 2235/3852* (2013.01); *C04B 2235/3865* (2013.01); *C04B 2235/3873* (2013.01); *C04B 2235/3895* (2013.01); *C04B 2235/5436* (2013.01)

(58) Field of Classification Search
USPC .................................................. 252/301.4 R
See application file for complete search history.

(56) References Cited

U.S. PATENT DOCUMENTS

| | | | | |
|---|---|---|---|---|
| 4,303,615 | A * | 12/1981 | Jarmell et al. | 422/557 |
| 4,408,651 | A * | 10/1983 | Smedley et al. | 164/316 |
| 4,767,455 | A * | 8/1988 | Jourdan | 75/610 |
| 6,110,847 | A * | 8/2000 | Yamamoto et al. | 442/179 |
| 7,138,756 | B2 * | 11/2006 | Gotoh et al. | 313/467 |
| 7,443,094 | B2 * | 10/2008 | Sakane et al. | 313/503 |
| 7,564,065 | B2 | 7/2009 | Sakuma et al. | |
| 2006/0022573 | A1 | 2/2006 | Gotoh et al. | |
| 2006/0192178 | A1 * | 8/2006 | Hirosaki | 252/301.4 F |
| 2006/0208262 | A1 | 9/2006 | Sakuma et al. | |
| 2007/0248519 | A1 | 10/2007 | Mitomo et al. | |
| 2008/0128726 | A1 * | 6/2008 | Sakata et al. | 257/98 |
| 2010/0308711 | A1 * | 12/2010 | Tamura | C09K 11/7734 313/503 |

FOREIGN PATENT DOCUMENTS

| | | |
|---|---|---|
| JP | A-2003-515655 | 5/2003 |
| JP | A-2003-277746 | 10/2003 |
| JP | A-2003-336059 | 11/2003 |
| JP | A-2004-67837 | 3/2004 |
| JP | A-2005-239985 | 9/2005 |
| JP | A-2006-8862 | 1/2006 |
| JP | 2006-052337 A | 2/2006 |
| JP | A-2006-28295 | 2/2006 |
| JP | A-2006-45271 | 2/2006 |
| JP | 2006-261512 A | 9/2006 |
| JP | A-2006-257353 | 9/2006 |
| WO | WO 01/40403 A1 | 6/2001 |
| WO | WO2006/013777 * | 2/2006 |
| WO | WO2006/080535 * | 8/2006 |
| WO | WO 2006/093135 A1 | 9/2006 |

OTHER PUBLICATIONS

European Search Report issued in European Patent Application No. 07 80 6968 on Apr. 16, 2010.

* cited by examiner

1

MANUFACTURING METHOD OF NITRIDE PHOSPHOR OR OXYNITRIDE PHOSPHOR

TECHNICAL FIELD

The present invention relates to a manufacturing method of a phosphor used for a cathode-ray tube (CRT), a display such as a field emission display (FED) and a plasma display (PDP), and an illumination device such as a fluorescent lamp and a fluorescent display tube, and particularly relates to the manufacturing method of the phosphor excited by the light of ultra violet to blue color, for emitting a visible light or a white light.

BACKGROUND OF THE INVENTION

At present, a discharge type fluorescent lamp and an incandescent bulb used as an illumination device involve problems that a harmful substance such as mercury is contained, and life span is short. However, in recent years, an LED emitting light of near ultraviolet/ultraviolet to blue color has been developed in sequence, and study and development have been actively performed to obtain an illumination device of the next generation capable of emitting light of white color by combining the light of ultra violet to blue color generated from this LED and the phosphor having an excitation band in the wavelength range from the ultraviolet to blue color. This illumination device has a lot of advantages such as less heat generation, with good life span without burn-out of a filament like an incandescent bulb, because it is constituted of a semiconductor element (LED) and a phosphor, and a harmful substance such as mercury is not contained, thus realizing an ideal illumination device.

Here, in order to obtain white light by combining the aforementioned LED and the phosphor, generally two systems can be considered. As one of them, the LED emitting blue color and the phosphor emitting yellow color that receives this blue emission and excited by this blue light, are combined, and white emission is obtained by combination of the blue emission and yellow emission which are set in a complementary color relation.

As the other one, the LED emitting near ultra violet and ultraviolet, the phosphor emitting red color (R) under excitation by emission of the near ultraviolet and ultraviolet, the phosphor emitting green color (G), the phosphor emitting blue color (B), and the phosphor emitting other color, are combined, to obtain white emission by mixture of the lights of these R, G, B, etc. By a method of obtaining the white emission by means of the light of these RGB, etc, an arbitrary emission color other than the white light can be obtained by combination and mixing ratio of the phosphors that emit light of the RGB, etc, and therefore an application range as the illumination device is wide.

As the phosphor used in this purpose of use, $Y_2O_2S:Eu$, $La_2O_2S:Eu$, $3.5MgO.0.5MgF_2.GeO_2:Mn$, $(La, Mn, Sm)_2O_2S.Ga_2O_3:Eu$ are given as examples of the red phosphor, $ZnS:Cu, Al$, $CaGa_2S_4:Eu$, $SrGa_2S_4:Eu$, $BaGa_2S_4:Eu$, $SrAl_2O_4:Eu$, $BAM:Eu, Mn$, $(Ba, Sr, Ca)_2SiO_4:Eu$ are given as examples of the green phosphor, and $BAM:Eu$, $Sr_5(PO_4)_3Cl:Eu$, $ZnS:Ag$, $(Sr, Ca, Ba, Mg)_{10}(PO_4)_6Cl_2:Eu$ are given as examples of the blue phosphor. Then, by combining the phosphor emitting these RGB, etc, and a light emission part (light emitting element) such as the LED emitting light of the near ultra violet and ultraviolet, a light source such as the LED emitting white light or a desired monochromatic light, and an illumination device including this light source can be obtained.

However, in the illumination obtaining white color by combining a blue LED and a yellow phosphor (YAG:Ce), the light emission on the longer wavelength side of a visible light region is insufficient, resulting in the emission of slightly bluish white color. Therefore, slightly reddish white emission like an electric bulb can not be obtained.

In the illumination of obtaining white color by combining the near ultra violet/ultra violet LED and the phosphor emitting light of RGB, etc, an excitation efficiency of the red phosphor out of three-color phosphors is deteriorated on the longer/wavelength side, thus deteriorating the emission efficiency. Therefore, a mixing ratio of the red phosphor must be increased, and in this case, the phosphor for improving luminance is insufficient, thus making it impossible to obtain a high luminance white color.

Therefore, in recent years, a oxynitride glass phosphor (for example, see patent document 1) having an excellent excitation on the longer wavelength side and capable of obtaining an emission peak with a broad half value width, the phosphor with sialon as a matrix (for example see patent documents 2, 3, 4), and the phosphor containing nitrogen such as silicon nitride-based nitrogen (for example, see patent documents 5, 6), are proposed. These phosphors containing nitrogen have a larger ratio of covalent bond, compared with an oxide-based phosphor, and therefore have an excellent excitation band even in the light of the wavelength of 400 nm or more, and are focused as the phosphor for the illumination device emitting white light.

Also, inventors of the present invention also reports the phosphor having a broad emission spectrum in a range of red color, having a broad flat excitation band in the range of the near ultraviolet/ultraviolet, and having an excellent emission efficiency. (see patent documents 7, 8, 9).

Patent document 1: Japanese Patent Laid Open Publication No. 2001-214162
Patent document 2: Japanese Patent Laid Open Publication No. 2003-336059
Patent document 3: Japanese Patent Laid Open Publication No. 2003-124527
Patent document 4: Japanese Patent Laid Open Publication No. 2004-067837
Patent document 5: Published Japanese Translation of a PCT Application No. 2003-515655
Patent document 6: Japanese Patent Laid Open Publication No. 2003-277746
Patent document 7: Japanese Patent Laid Open Publication No. 2005-239985
Patent document 8: Japanese Patent Laid Open Publication No. 2006-008862
Patent document 9: Japanese Patent Laid Open Publication No. 2006-028295

DISCLOSURE OF THE INVENTION

Problem to be Solved by the Invention

However, an emission efficiency of the phosphor containing the nitrogen of the aforementioned patent documents 1 to 6 in a case of being excited by excitation light of the near ultraviolet/ultraviolet does not meet a satisfactory level, and a sufficient emission intensity and luminance can not be obtained, and therefore seems to be insufficient when used in a light emission device.

In addition, although the phosphor proposed by the inventors of the present invention is the phosphor having excellent emission efficiency compared with a conventional phosphor, the luminance, being the most important factor as illumination, does not meet a satisfactory level when white LED illumination is manufactured by combining this phosphor and the near ultraviolet/ultraviolet LED. Therefore further improvement of the emission efficiency and emission intensity/luminance of the phosphor is required.

Therefore, as a result of adjusting samples of various phosphors and studying on the improvement of the emission efficiency, the inventors of the present invention found a cause such as carbon and/or oxygen contained in the phosphors as impurities.

Here, the inventors of the present invention further study on an origin of the carbon and/or oxygen contained in the phosphor as impurities. As a result, it is found that these elements such as the carbon and/or oxygen contained in the phosphor as impurities are influenced by the oxygen contained in an atmospheric gas in minute amounts and the carbon contained in a carbon member in a firing furnace.

In view of the above-described circumstances, the present invention is provided, and an object of the present invention is to provide a manufacturing method of the phosphor capable of further improving the emission efficiency of the nitride phosphor or the oxynitride phosphor, by suppressing the impurities of the phosphor caused by the oxygen contained in the atmospheric gas in a minute amount and the carbon contained in the carbon member in the firing furnace.

Means for Solving the Problem

In order to solve the above-described problem, as a result of strenuous efforts of the inventors of the present invention, it is found that the emission intensity of the obtained nitride or oxynitride phosphor is increased by about 20%, by putting raw material powders of this nitride or oxynitride phosphor in a firing container made of nitride, and firing the raw material powders, with this firing container covered with a lid. Thus, the present invention is completed.

Namely, a first structure for solving the problem provide a manufacturing method of a nitride phosphor or an oxynitride phosphor, wherein raw material powders are put in a firing container made or nitride and these raw material powders are fired, with this firing container covered with a lid.

A second structure provides the manufacturing method of the nitride phosphor or the oxynitride phosphor according to the first structure, wherein the firing container made of the nitride is the firing container made of boron nitride.

A third structure provides the manufacturing method of the nitride phosphor or the oxynitride phosphor according to the first or the second structure, wherein the lid is a lid made of boron nitride.

A fourth structure provides the manufacturing method of the nitride phosphor or the oxynitride phosphor according to any one of the first to third structures, wherein the phosphor is expressed by a general composition formula $MABO_oN_{3-2/3o}$:Z in which element M is one or more kinds of elements having bivalent valency, element A is one or more kinds of elements having tervalent valency, element B is one or more kinds of elements having tetravalent valency, 0 is oxygen, N is nitrogen, and element Z is an activating agent, satisfying o≥0.

A fifth structure provides the manufacturing method of the nitride phosphor or the oxynitride phosphor according to the fourth structure, wherein the element M is one or more kinds of elements selected from a group consisting of Mg, Ca, Sr, Ba, Zn, the element A is one or more kinds of elements selected from a group consisting of B (boron), Al, Ga, the element B is Si and/or Ge, and the element Z is one or more kinds of elements selected from a group consisting of rare earth elements and transitional metal elements.

A sixth structure provides the manufacturing method of the nitride phosphor or the oxynitride phosphor according to the fourth or firth structure, wherein the element A is Al, and the element B is Si.

A seventh structure provides the manufacturing method of the nitride phosphor or the oxynitride phosphor according to any one of the fourth to sixth structures, wherein the element M is Ca, and the element Z is Eu.

ADVANTAGE OF THE INVENTION

According to the manufacturing method of the nitride phosphor or the oxynitride phosphor of the first to seventh structures, the emission efficiency of the phosphor can be improved by about 20%.

BEST MODE FOR CARRYING OUT THE INVENTION

Best modes for carrying out the present invention will be described hereunder. However, the present invention is not limited to the following embodiments.

As described in a manufacturing method of a phosphor according to this embodiment, it is possible to obtain the phosphor with emission intensity increased by about 20%, by putting raw material powders of a nitride phosphor or an oxynitride phosphor (described simply as "phosphor" in some cases hereunder.) into a firing container made of nitride, and firing the raw material powders with this firing container covered with a lid.

A detailed reason for increasing the emission intensity of the phosphor obtained by this manufacturing method by about 20% is unknown. However, when the inventors of the present invention measures oxygen content and carbon impurity content in the obtained phosphor, the oxygen content is less than 2.7 wt %, and the carbon impurity content is less than 0.06 wt %. Therefore, it appears that adequate control of the oxygen content and reduction of the carbon impurity content contributes to the improvement of the emission intensity.

The phosphor obtained by the manufacturing method of the phosphor according to this embodiment is expressed by a general composition formula $MABO_oN_{3-2/3o}$:Z, wherein element M is one or more kinds of elements having bivalent valency, element A is one or more kinds of elements having tervalent valency, element B is one or more kinds of elements having tetravalent valency, O is oxygen, N is nitrogen, and element Z is an activating agent, satisfying o≥0 (the phosphor becomes the nitride phosphor when satisfying o=0, and becomes the oxynitride phosphor when satisfying o≥0.), which is the phosphor having an excitation band in a broad wavelength range from ultraviolet to green color (wavelength range from 250 to 550 nm) However, the emission intensity seems to be easily affected by the contents of the oxygen and the carbon. Accordingly, the manufacturing method of the phosphor according to this embodiment seems to be the manufacturing method suitable for further improving the emission efficiency of the phosphor.

Preferably, the element M is at least one or more kinds of elements selected from the group consisting of Be, Mg, Ca, Sr, Ba, Zn, Cd, and Hg, and further preferably is at least one or more elements selected from the group consisting of Mg, Ca, Sr, Ba, and Zn, and most preferably is Ca.

Preferably, the element A is one or more kinds of elements selected from the group consisting of B, Al, Ga, In, Tl, Y, Sc, P, As, Sb, Bi, and further preferably is one or more kinds of elements selected from B, Al, Ga, and most preferably is Al.

Preferably, the element B is one or more kinds of elements selected from the group consisting of Si, Ge, Sn, Ti, Hf, Mo, W, Cr, Pb, Zr, and further preferably is Si and/or Ge, and most preferably Si.

Preferably, the element Z is at least one or more kinds of elements selected from the rare earth elements or the transitional metal elements. However, the element Z is preferably at least one or more kinds of elements particularly selected from Eu, Mn, Sm, Ce. Above all, if Eu is used, the phosphor exhibits strong light emission of orange color to red color, and therefore Eu is more preferable as an activating agent of the phosphor for a light source (LED) emitting white color.

The manufacturing method of the phosphor according to this embodiment will be described, with manufacture of $CaAlSiO_oN_{3-2/3o}$:Eu (wherein Eu/(Ca+Eu)=0.015), being the phosphor, taken as an example.

First, as raw materials, $Ca_3N_2$(2N), AlN(3N), $Si_3N_4$(3N) are prepared as the nitride of Ca, Al, Si. As an Eu raw material, $Eu_2O_3$(3N) is prepared.

These raw materials are weighed and mixed, so that the molar ratio of each element is Ca:Al:Si:Eu=0.985:1:1:0.015. (satisfying (Ca+Eu):Al:Si:=1:1:1.). Although the mixing may be performed by a normal mixing method using a mortar, etc, it is convenient to operate in a glove box in an inactive atmosphere of nitrogen, etc.

The reason for operating the mixing in the glove box in an inactive atmosphere is that the ratio of oxygen content contained in a matrix structure element is collapsed due to oxidization and decomposition of the raw materials when the operation is performed in the atmospheric air, thus posing a problem that the emission characteristic is deteriorated, and in addition, the composition seems to be deviated from a target composition of the phosphor. Further, since the nitride of each raw material element is easily affected by moisture, and therefore preferably an inactive gas, from which the moisture is sufficiently removed, is used. When a nitride raw material is used as each raw material element, a dry-type mixing is preferable as a mixing system for avoiding the decomposition of the raw materials, and a normal dry-type mixing method may be adopted, wherein a ball mill and the mortar are used.

A crucible made of boron nitride, being a firing container, is filled with the raw materials that have undergone mixing process, then a temperature is increased up to 1500° C. at 15° C./min in the inactive atmosphere of nitrogen, etc, and the raw materials are retained and fired for 3 hours at 1500° C. A firing temperature may be preferably set at 1000° C. or more and more preferably set at 1400° C. or more. A retaining time can be made shorter, because firing proceeds speedily as the firing temperature is set higher. Even if the firing temperature is low, a target emission characteristic can be obtained by retaining the raw materials for a long time. As the firing time is set longer, a particle growth is progressed and a particle shape becomes larger. Therefore, an arbitrary firing time may be set depending on a target particle size.

The inventors of the present invention found the fact that the emission intensity of the phosphor was lowered by an increase of an amount of carbon and an amount of oxygen contained in the phosphor. Then, after study on a material and quality of the firing container, the inventors of the present invention propose the improvement of the emission efficiency of the phosphor obtained by appropriately controlling the material and quality of the firing container (see patent document 9). Namely, when the raw materials are fired by using the firing container made of carbon, as the firing container (such as crucible) for firing the raw materials of the phosphor, there is a possibility that carbon is mixed in the fired phosphor as impurity from the firing container made of carbon, thus posing a problem that the emission intensity of the phosphor is deteriorated. According to the study by the inventors of the present invention, it is found that if the amount of the carbon contained in the phosphor is 0.08 wt % or more, the emission intensity of the phosphor begins to deteriorate. Further, when the raw materials are fired by using the firing container made of alumina, it is found that oxygen is diffused as the impurity into the fired phosphor from the firing container made of alumina, thus posing a problem that the emission intensity of the phosphor is deteriorated. According to the study by the inventors of the present invention, it is found that if the amount of the oxygen contained in the phosphor becomes 3.0 wt % or more, the emission intensity of the phosphor begins to deteriorate.

Here, as a result of further study by the inventors of the present invention, it is found that when the raw materials are fired, with the boron nitride firing container (such as a crucible) covered with a lid, the emission intensity of the phosphor is improved by about 20%.

Namely, the boron nitride firing container was used as the firing container (such as the crucible), and the raw materials of the phosphor were put in this firing container. Then, after putting the raw materials of the phosphor into this firing container, a boron nitride container one size larger than the aforementioned boron nitride firing container (one size larger container specifically means the boron nitride container having an inner dimension of approximately the same to twice an outer dimension of the aforementioned boron nitride firing container.) was prepared and disposed in a furnace, with the boron nitride container one size larger than the aforementioned boron nitride firing container as a lid, in a state of covering the aforementioned firing container.

After disposing the firing container covered with a lid in the furnace, inside of the furnace is vacuumized and replaced with nitrogen, the temperature is increased up to 1500° C. at 15° C./min with an in-furnace pressure set at 0.05 MPa, in a circulating nitrogen atmosphere (in a flow state of 20.0 L/min), and the raw materials were retained and fired for 3 hours at 1500° C. Thereafter, the temperature was lowered from 1500° C. to 50° C. for 1 hour and 30 minutes, and the firing was completed.

Then, the fired raw materials were taken out from the furnace, which were then pulverized up to a proper particle size in the atmospheric air by using the mortar, and the phosphor of the composition formula $CaSiAlO_{0.17}N_{2.89}$:Eu was manufactured.

By covering the boron nitride firing container by the boron nitride container one size larger than the aforementioned firing container, and by firing the raw materials with this firing container covered with a lid, it may be possible to prevent mixture of the oxygen contained in the atmospheric gas in a minute amount into the obtained phosphor, and also it may be possible to prevent the mixture of the carbon flying from the carbon member in the furnace. As a result, it appears that impurity content of the carbon and oxygen not contributing to the light emission is reduced.

As a result, from the reason as will be described later, it appears that the deterioration of the emission intensity of the phosphor can be suppressed and the emission efficiency of this phosphor can be improved. In addition, other than the mixture of the oxygen and carbon, it is possible to prevent the mixture of impurity elements such as Fe, Co, Ni that are possibly generated from the member inside of the furnace and the mixture of residuals of decomposed raw materials that remain in the furnace. This also makes it possible to suppress the deterioration of the emission intensity and improve the emission efficiency of the phosphor.

As a method of covering the firing container with a lid, as described above, the container of one size larger shape may be turned upside down to cover an upper part of the firing container, and it may be also possible to cover an opening part of the upper part of the firing container with a plate-like lid. As a material of this lid, the material that can be used in the aforementioned gas atmosphere such as $Al_2O_3$, $Si_3N_4$, AlN, sialon, BN (boron nitride) may be used. However, if the BN is used, the mixture of the impurity from the lid can be preferably avoided.

Meanwhile, the characteristics of the phosphor, being a firing sample, may be possibly affected by the lid made of carbon that allows the carbon and decomposed gas to be released. However, as will be described later, as long as the lid is used for the purpose of preventing the mixture of the impurity of the carbon that peels off from the furnace and also used as a table, a sufficient effect can be obtained. However, in this case also, it is preferable to use a high purity carbon material as the lid made of carbon, with less release of the carbon and the decomposed gas.

An example of the firing container and the lid covering this container will be described by using FIG. 1, with a crucible used as the firing container. FIG. 1 is a perspective view illustrating a procedure of accommodating the crucibles in the containers that function as lids, and placing these crucibles and containers in the firing furnace. Then, FIG. 1(A) illustrates a state in which the crucibles are accommodated in the containers that function as lids, FIG. 1(B) illustrates a state in which the containers accommodating the crucibles that function as a plurality of lids are placed on the table, FIG. 1(C) illustrates a state in which the containers accommodating the crucibles that function as the lids described in FIG. 1(B) and the table are accommodated in a further larger carbon container, and FIG. 1(D) schematically illustrates a sate in which the further larger carbon container described in FIG. 1(C) is placed in the firing furnace.

First, as illustrated in FIG. 1(A), containers 10, being the lids, are formed into a bottomed cylindrical shape one size larger than a bottomed cylindrical crucible 11, and are turned upside down with respect to each crucible 11, to accommodate this crucible 11 inside so as to cover this crucible 11.

As illustrated in FIG. 1(B), when the crucible 11 is placed in the firing furnace 14, first, one or a plurality of crucibles 11 containing a mixture 16 of the phosphor raw materials are arranged on a carbon table 12, and each crucible 11 is covered with the container 10 as a lid.

Next, as illustrated in FIG. 1(C) and FIG. 1(D), these crucibles 11 and containers 10 are accommodated in a carbon container 13 together with the carbon table 12, and are placed in the firing furnace 14. The carbon container 13 uniformizes the heat from a plurality of carbon heaters 15 placed in a peripheral direction in the firing furnace 14, and also functions as the lid for covering the crucible 11 in the same way as the container 10.

Other example of the lid will be described by using FIG. 2. FIG. 2 illustrates a tray accommodating the mixture of the phosphor raw materials, together with the container that functions as the lid, wherein FIG. 2(A) is a perspective view thereof, and FIG. 2(B) is a sectional view thereof.

As illustrated in FIGS. 2(A)(B), the mixture 16 of the phosphor raw materials is accommodated in a box-shaped tray 20, with an upper side opened. This tray 20 is constituted of the same material as that of the crucible 11, and is constituted of, for example, BN (boron nitride). The lid of the tray 20 may be formed into a plate-like shape to cover an upper side opening part of the tray 20. However, as illustrated in FIG. 2, by using a box-shaped container 21 with a lower side opened, it may also be possible to cover the tray 20 by this container 21 so as to accommodate the tray 20 in this container 21. In this case, it is preferable to use the box-shaped container 21 having the inner dimension of approximately the same dimension to about twice the outer dimension of the tray 20.

This embodiment provides the manufacturing method capable of particularly suppressing the deterioration of the emission intensity, in the phosphor containing the nitrogen like the nitride or the oxynitride. Although not clarified, the reason therefore is considered as follows.

This is because in the nitride phosphor, by mixing of the oxygen, oxygen atoms with different ion radius are replaced with a site of nitrogen atoms, and its crystal structure is collapsed, or by replacing nitrogen atoms having tervalent valency with oxygen atoms having bivalent valency, balance of the valency is collapsed, thus allowing a crystal defect to occur, resulting in the deterioration of the emission intensity of the phosphor. In the oxynitride phosphor also, it appears that the ratio of the oxygen atoms to the nitrogen atoms is collapsed and is deviated from the oxygen/nitrogen ratio capable of maintaining an optimal crystal structure, resulting in the collapse of the crystal structure, and also the nitrogen atoms having tevalent valency are replaced with the oxygen atoms having bivalent valency, and this causes the collapse of the balance of valency and crystal defect to occur, resulting in the deterioration of the emission intensity of the phosphor.

In addition, if the carbon, etc, flied from the furnace is mixed in the phosphor sample, this carbon absorbs the light emitted from the phosphor and absorbs the light emitted for exciting the phosphor. Therefore, it appears that total excitation energy can not be used for exciting the phosphor, thus inviting the substantial deterioration of the output of the light emitted from the phosphor. Moreover, it appears that reaction occurs between the carbon mixed in the phosphor sample and the phosphor sample during firing, and the carbon atoms are diffused and advanced into the phosphor sample, which are then taken in the phosphor sample as impurity atoms, thus causing the deterioration of the emission intensity to occur. In a case of a substance originally containing a plurality of oxygen atoms in the phosphor sample like the oxide phosphor, a slight amount of carbon reacts with the oxygen atoms in the sample to become $CO_2$ and is removed. Therefore it can be estimated that the oxide phosphor is not affected so much by a contamination of the carbon in the furnace. However, in a case of a substance originally having less content of oxygen atoms like the oxynitride phosphor with less content of oxygen, it appears that the carbon in the furnace remains as it is in the sample, and therefore the nitride phosphor seems to be easily affected by the contamination of the carbon.

In addition, it appears that impurity elements such as Fe, Co, Ni that are possibly generated from the member in the furnace are mixed and taken into the phosphor sample to deteriorate the emission intensity, or residues of the decomposed raw materials remained in the furnace are mixed in and react with the phosphor sample, and the elements present in the residues are taken into the phosphor sample as impurity elements to cause the deterioration of the emission intensity to occur.

Namely, according to the manufacturing method of the present invention, it is possible to prevent mixing of the impurity elements such as oxygen, carbon, Fe, Co, Ni, and the residues of decomposed raw materials, and therefore the deterioration of the emission intensity caused thereby can be suppressed.

In any case, the manufacturing method according to this embodiment is an excellent manufacturing method capable of increasing the emission intensity of the nitride or oxynitride phosphor by about 20%, while this is an industrially easy method.

Note that this embodiment shows the manufacturing method suitable as the manufacturing method of the nitride or oxynitride phosphor, and $CaAlSiO_oN_{3-2/3o}$, is given as an example of the phosphor. However, the present invention is not limited to this phosphor. The aforementioned method can be applied to publicly-known $Ca_2Si_5N_8$:Eu, $Sr_2Si_5N_8$:Eu, $Ba_2Si_5N_8$;Eu, $(Ca, Sr, Ba)_2Si_5N_8$:Eu, $CaAl_2Si_4N_8$:Eu, $CaSiN_2$:Eu, $M_wAl_xSi_yB_zN_{(2/3)w+x+(4/3)y+z}$ as the nitride phosphor, and can be applied to $Ca_x(Al, Si)_{12}(O, N)_{16}$:Eu $(0<x\leq1.5)$, $CaSi_2O_2N_2$:Eu, $SrSi_2O_2N_2$:Eu, $BaSi_2O_2N_2$:Eu, $(Ca, Sr, Ba)Si_2O_2N_2$:Eu, $2.75SrO \cdot Si_3N_4$:Eu, $SrAl_xSi_{4-x}O_xN_{7-x}$:Ce $SrAl_xSi_{6-x}O_{1+x}N_{8-x}$:Eu, $SrAl_{19}Si_9ON_{31}$:Eu, $LaAlSi_{6-z}Al_zN_{10-z}O_z$:Ce, $Si_{6-z}Al_z$ $O_zN_{8-z}$:Eu as the oxynitride phosphor.

In combination with a light emission part (particularly the light emission part that emits light in the wavelength range from 250 to 550 nm) by a publicly-known method, the phosphor in a powder state manufactured by the manufacturing method according to this embodiment has the excitation band in a broad wavelength range in which the light emission part emits light, and light emission is performed by this phosphor. Therefore, it is possible to obtain a light source with high light emission efficiency that emits a visible light or white light. Particularly, in combination with the LED that emits light in the wavelength range from 250 to 550 nm as the light emission part by the publicly-known method, it is possible to obtain the LED with high emission efficiency that emits the visible light or white light.

Accordingly, this light source (LED) can be used as a display device such as CRT and PDP, and various light sources of an illumination device such as a fluorescent lamp.

EXAMPLES

The present invention will be specifically described hereunder, based on examples.

Example 1

Commercially available $Ca_3N_2$(2N), AlN(3N), $Si_3N_4$ (3N), $Eu_2O_3$(3N) were prepared, and each raw material was weighed so that the molar ratio of each element was Ca:Al:Si:Eu=0.985:1:1:0.015, and was mixed by using the mortar in a glove box in the nitrogen atmosphere. The crucible made of boron nitride (having inner diameter 30 mm, outer diameter 36 mm, height 27 mm) was filled with the mixed raw materials, and this crucible was covered with the boron nitride container one size larger than the boron nitride crucible (having inner diameter 40 mm, outer diameter 46 mm, height 39 mm), and the boron nitride crucible covered with one size larger boron nitride container as the lid was disposed in the furnace. Here, these firing containers covered with lids were disposed on the carbon table with heights adjusted so that a position of each firing container suits a heater part, and each firing container was disposed in the furnace in a state of being put in a cylindrical carbon container having outer diameter 145 mm, inner diameter 139 mm, and height 210 mm.

Next, after inside of the furnace was vacuumized and replaced with nitrogen, the temperature was increased up to 1500° C. at 15° C./min with an in-furnace pressure set at 0.05 MPa in a circulating nitrogen atmosphere (in a flow state of 20.0 L/min), and the raw materials were retained and fired for 3 hours at 1500° C. Thereafter, the temperature was lowered from 1500° C. to 50° C. for 1 hour and 30 minutes, and the firing was completed. Then, fired samples were pulverized by using the mortar in the atmospheric air, up to about 7 μm of the average particle size, and the phosphor sample according to an example 1 was obtained.

The obtained phosphor powder was irradiated with monochromatic light of 460 nm, and the emission intensity was measured. However, the emission intensity is shown by relative intensity, which is a standardized value with the emission intensity of the phosphor in a comparative example 1 as will be described later set as 100%. This measurement result is shown in table 1. Also, the oxygen content and the carbon content obtained by chemical analysis were 2.69 wt % and 0.052 wt % respectively. This analysis result is shown in table 2. Note that the composition formula of this phosphor calculated from the analysis result was $CaAlSiO_{0.22}N_{2.85}$:Eu.

TABLE 1

| | Relative emission intensity (%) | Peak wavelength (nm) |
|---|---|---|
| Example 1 | 119.8 | 660.0 |
| Comparative example 1 | 100.0 | 654.5 |

TABLE 2

| | Oxygen content (wt %) | Carbon content (wt %) |
|---|---|---|
| Example 1 | 2.69 | 0.052 |
| Comparative example 1 | 2.92 | 0.062 |

Comparative Example 1

Commercially available $Ca_3N_2$(2N), AlN(3N), $Si_3N_4$ (3N), $Eu_2O_3$(3N) were prepared, and each raw material was weighed so that the molar ratio of each element was Ca:Al:Si:Eu=0.985:1:1:0.015, and was mixed by using the mortar in the glove box in the nitrogen atmosphere. The crucible made of boron nitride (having inner diameter 30 mm, outer diameter 36 mm, height 27 mm) was filled with the mixed raw materials, and was disposed in the furnace in a state of not covering the crucible made of boron nitride with a lid. Here, these firing containers were disposed on the carbon table with heights adjusted so that a position of each firing container suits a heater part, and each firing container was disposed in the furnace in a state of being put in a cylindrical carbon container having outer diameter 145 mm, inner diameter 139 mm, and height 210 mm.

Next, after the inside of the furnace was vacuumized and replaced with nitrogen, the temperature was increased up to 1500° C. at 15° C./min with an in-furnace pressure set at 0.05 MPa in a circulating nitrogen atmosphere (in a flow state of 20.0 L/min), and the raw materials were retained and fired for 3 hours at 1500° C. Thereafter, the temperature was lowered from 1500° C. to 50° C. for 1 hour and 30 minutes, and the firing was completed. Then, the fired samples were pulverized by using the mortar in the atmospheric air up to about 7 μm of the average particle size, and the phosphor sample according to a comparative example 1 was obtained.

The obtained phosphor powder was irradiated with monochromatic light of 460 nm, and the emission intensity was measured. This measurement result is shown in table 1. Also, the oxygen content and the carbon content obtained by chemical analysis were 2.92 wt % and 0.062 wt % respectively. This analysis result is shown in table 2. Note that the composition formula of this phosphor calculated from the analysis result was $CaAlSiO_{0.26}N_{2.83}$:Eu.

As shown in the table 1, the result was that the emission intensity of the phosphor in the example 1 obtained by firing the raw materials with the boron nitride crucible, being the firing container, covered with a lid, was higher by about 20% than the emission intensity of the phosphor in the comparative example 1 obtained by firing the raw materials with the crucible not covered with a lid. It appears that the emission intensity is improved by low contents of oxygen and carbon, because the oxygen content and the carbon content are low in the phosphor fired in a state of covering the crucible with a lid. Therefore, the manufacturing method of the phosphor according to this embodiment is the excellent manufacturing method capable of improving the emission efficiency of the phosphor, while this is an industrially easy method.

BRIEF DESCRIPTION OF THE DRAWINGS

FIG. 2(A) is a perspective view, and FIG. 2(B) is a sectional view.

DESCRIPTION OF SIGNS AND NUMERALS

Figure 1:
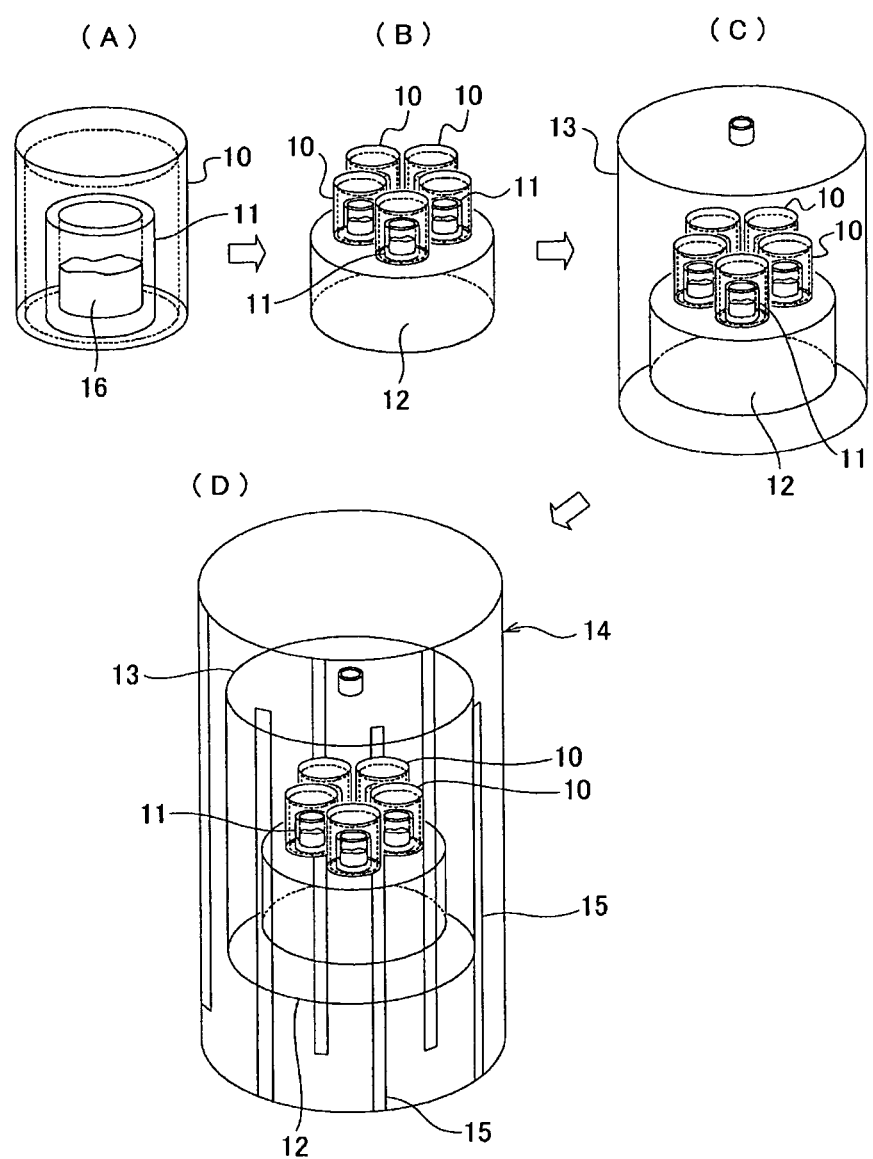
FIG. 1 is a perspective view illustrating a procedure of accommodating a firing container (crucible) in a container that functions as a lid, and placing this firing container and the container that functions as a lid in a firing furnace.
Figure 2:
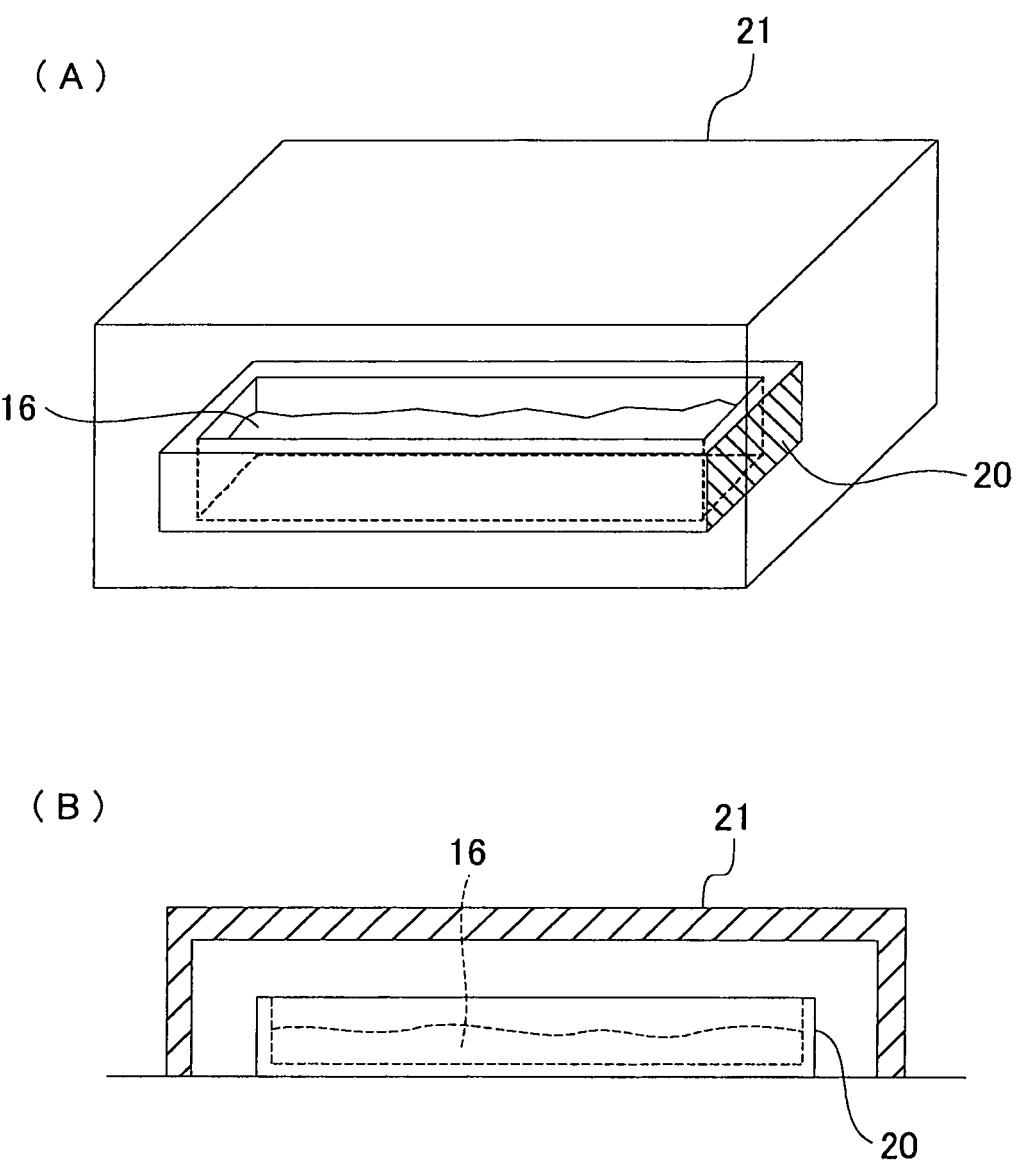
FIG. 2 is a view illustrating a tray in which a mixture of phosphor raw materials are accommodated, together with the container that functions as a lid.

10 Container (container used as a lid)
11 Firing container (crucible)
14 Firing furnace

The invention claimed is:

1. A method of manufacturing a nitride phosphor or an oxynitride phosphor, the method comprising:
placing raw material powders in a firing container made of boron nitride and covering the firing container with a lid made of boron nitride;
placing the firing container with the raw material powders therein in a firing furnace;
accommodating the firing container in a carbon container, such that the carbon container and the firing container with the raw material powders therein are located in the firing furnace;
vacuumizing an inside of the firing furnace and providing nitrogen atmosphere to the inside of the firing furnace; and
firing the raw material powders in a circulating nitrogen atmosphere,
wherein the phosphor is expressed by a general composition formula $MABO_oN_{3-2/3o}$:Z in which element M is one or more different elements having bivalent valency, element A is one or more kinds of elements having tervalent valency, element B is one or more kinds of elements having tetravalent valency, O is oxygen, N is nitrogen, and element Z is an activating agent, satisfying $o \geq 0$, and
the phosphor contains less than 0.06 wt % of carbon.

2. The method according to claim 1, wherein the element M is one or more different elements selected from a group consisting of Mg, Ca, Sr, Ba, Zn, the element A is one or more different elements selected from a group consisting of B (boron), Al, Ga, the element B is Si and/or Ge, and the element Z is one or more different elements selected from a group consisting of rare earth elements and transitional metal elements.

3. The method according to claim 1, wherein the element A is Al, and the element B is Si.

4. The method according to claim 1, wherein the element M is Ca, and the element Z is Eu.

5. The method according to claim 1, wherein the lid is a container that is larger than the firing container and is turned upside down to cover at least an upper part of the firing container.

6. The method according to claim 1, wherein the raw material powders are fired in a firing furnace having a carbon heater.

7. The method according to claims 1, wherein the phosphor contains less than 2.7 wt % of oxygen.

8. A method according to claim 1, wherein the phosphor contains indispensable oxygen.

9. A method according to claim 1, wherein Z is Eu, and only $Eu_2O_3$(3N) is used as an Eu raw material.

10. A method according to claim 1, wherein a molar ratio of raw materials Ca:Al:Si:Eu=0.985:1:1:0.015.

* * * * *